United States Patent
Uchida

(10) Patent No.: US 8,395,669 B2
(45) Date of Patent: Mar. 12, 2013

(54) IMAGE DATA TRANSMISSION APPARATUS AND METHOD, REMOTE DISPLAY CONTROL APPARATUS AND CONTROL METHOD THEREOF, PROGRAM, AND STORAGE MEDIUM

(75) Inventor: Hitoshi Uchida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 139 days.

(21) Appl. No.: 13/176,428

(22) Filed: Jul. 5, 2011

(65) Prior Publication Data

US 2011/0261080 A1    Oct. 27, 2011

Related U.S. Application Data

(62) Division of application No. 11/466,520, filed on Aug. 23, 2006.

(30) Foreign Application Priority Data

Aug. 23, 2005  (JP) ................................. 2005-241558

(51) Int. Cl.
*H04N 5/225* (2006.01)
*H04N 5/222* (2006.01)

(52) U.S. Cl. ............ 348/207.1; 348/333.06; 348/333.07

(58) Field of Classification Search ............. 348/333.06, 348/333.07
See application file for complete search history.

(56) References Cited

U.S. PATENT DOCUMENTS

| | | | |
|---|---|---|---|
| 6,097,431 A * | 8/2000 | Anderson et al. | 348/231.7 |
| 6,313,877 B1 * | 11/2001 | Anderson | 348/333.05 |
| 7,046,286 B1 * | 5/2006 | Kobayashi et al. | 348/333.06 |
| 7,466,357 B2 * | 12/2008 | Myojo | 348/333.05 |
| 2002/0019833 A1 | 2/2002 | Hanamoto | 707/500 |
| 2003/0128390 A1 * | 7/2003 | Yip et al. | 358/1.18 |
| 2004/0036791 A1 * | 2/2004 | Voss et al. | 348/333.07 |
| 2005/0046727 A1 * | 3/2005 | Nozaki et al. | 348/333.07 |
| 2005/0134939 A1 * | 6/2005 | Ikeda et al. | 358/471 |
| 2005/0190277 A1 * | 9/2005 | Juen et al. | 348/310 |
| 2006/0098186 A1 * | 5/2006 | Yumiki | 356/3.07 |

\* cited by examiner

*Primary Examiner* — Sinh Tran
*Assistant Examiner* — Jason Flohre
(74) *Attorney, Agent, or Firm* — Cowan, Liebowitz & Latman, P.C.

(57) ABSTRACT

In a case where a display screen of a transmission originator, including image data such as photographs, is displayed remotely on a device of a transmission destination, compressed image data of the image portion such as photographs on the display screen which is stored in a storage unit of the transmission originator is transmitted to the transmission destination device so that the image of the photograph portion can be displayed remotely on the screen of the transmission destination device with high image quality.

7 Claims, 14 Drawing Sheets

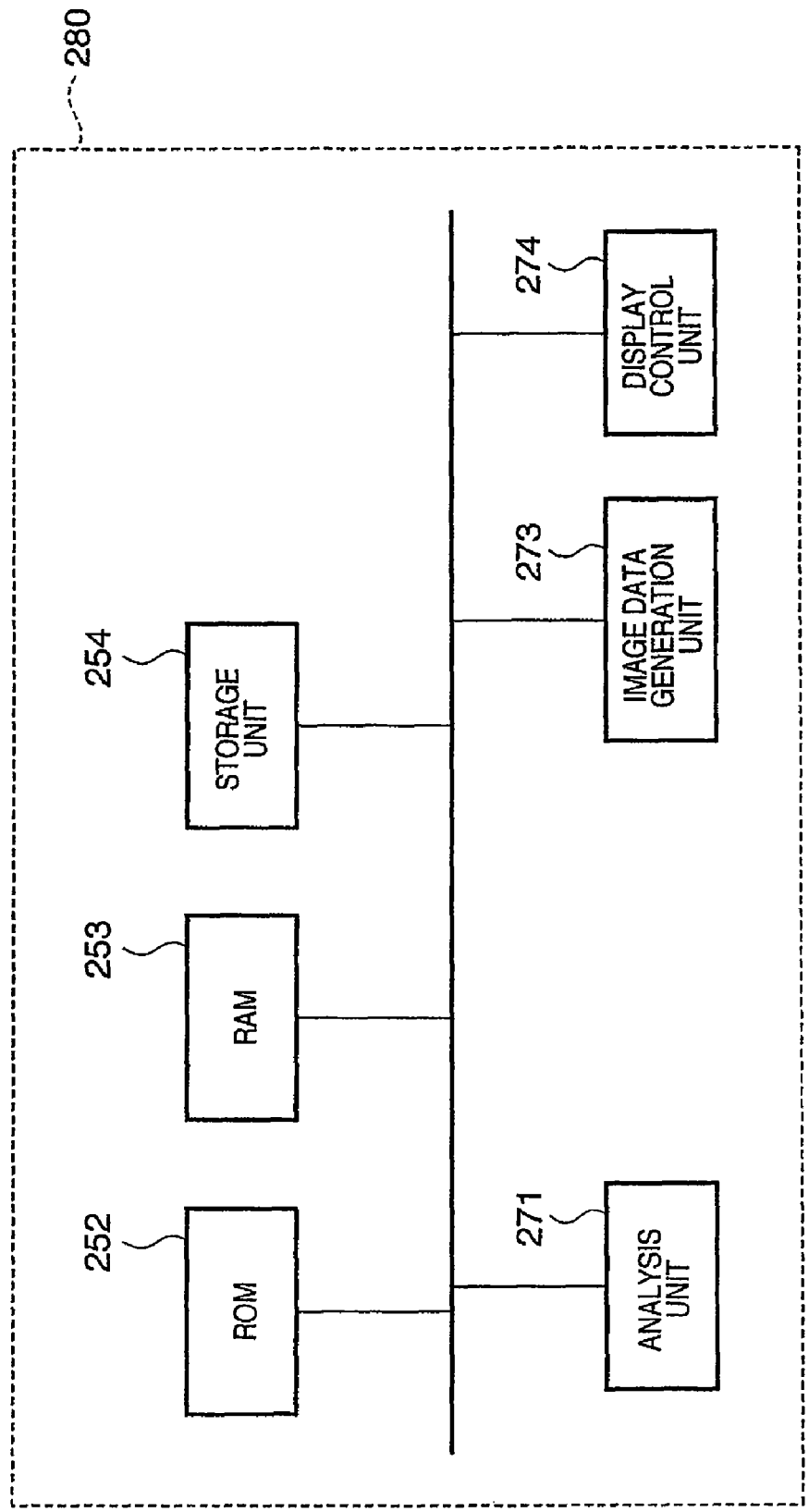

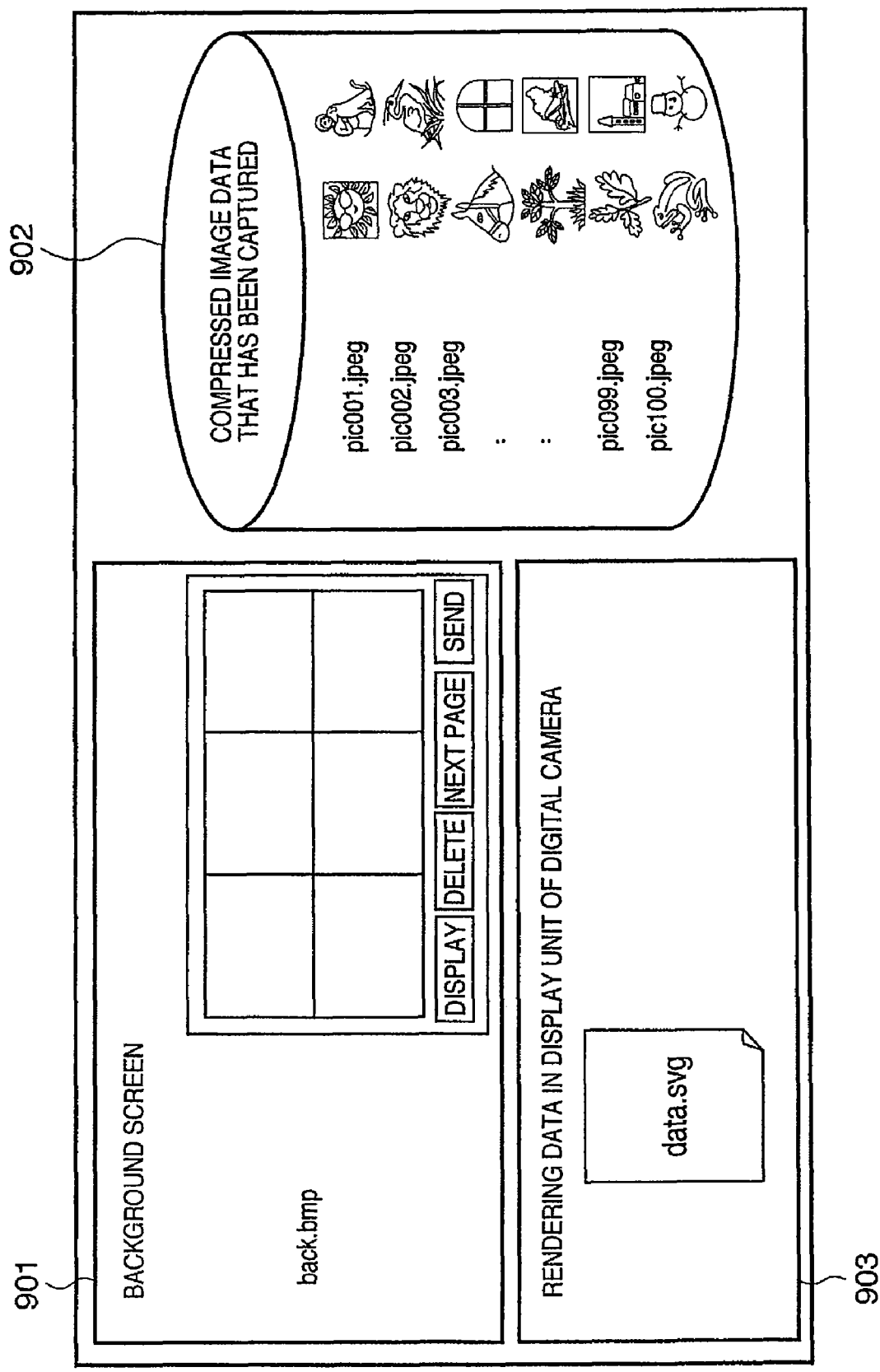

FIG. 10

```
<svg xmlns="http://www.w3.org/2000/svg" xmlns:xlink="http://www.w3.org/1999/xlink">
<image id="0" x="0"   y="0"   width="100" height="100" xlink:href="back.bmp">
<image id="1" x="50"  y="50"  width="100" height="100" xlink:href="pic001.jpg">
<image id="2" x="150" y="50"  width="100" height="100" xlink:href="pic002.jpg">
<image id="3" x="250" y="50"  width="100" height="100" xlink:href="pic003.jpg">
OMITTED
..
<image id="6" x="250" y="150" width="100" height="100" xlink:href="pic006.jpg">
</svg>
```

ID | TOP LEFT COORDINATES ON SCREEN | WIDTH | HEIGHT | DATA NAME

```
MIME-Version:1.0
Content-Type:Multipart/Related;  ~1201
type="application/xop+xml";
start="<message@example.org>";
start-info="text/xml"

--MIME_boundary
Content-Type:application/xop+xml;
   charset=UTF-8;
   type="text/xml"
Content-Transfer-Encoding:8bit
Content-ID:<message@example.org>

<svg xmlns="http://www.w3.org/2000/svg" xmlns:xlink="http://www.w3.org/1999/xlink">
<image id="0" x="0" y="0" width="400" height="350" xlink:href="back.bmp"/>
         ~1202                              ~1204            ~1203
<image id="6" x="250" y="150" width="100" height="100" xlink:href="pic006.jpg"/>
</svg>

--MIME_boundary
Content-Type:image/bmp
Content-Transfer-Encoding:binary
Content-ID:<back.bmp>

// BINARY DATA OF BITMAP IMAGE
--MIME_boundary
Content-Type:image/jpeg              }1205
Content-Transfer-Encoding:binary
Content-ID:<pic001.jpg>

// BINARY DATA OF JPEG IMAGE
:
:
```

IMAGE DATA TRANSMISSION APPARATUS AND METHOD, REMOTE DISPLAY CONTROL APPARATUS AND CONTROL METHOD THEREOF, PROGRAM, AND STORAGE MEDIUM

CROSS-REFERENCE TO RELATED APPLICATION

This application is a divisional of application Ser. No. 11/466,520, filed Aug. 23, 2006 now abandoned, the entire disclosure of which is hereby incorporated by reference.

BACKGROUND OF THE INVENTION

1. Field of the Invention

The present invention relates to a technique of displaying an image, which is displayed on a display unit of a portable device, on a display unit of an apparatus connected to the portable device through a network with high image quality.

2. Description of the Related Art

Still images and moving images captured by an image capturing apparatus, e.g., a digital camera and a video camera, can be displayed on a screen of a television apparatus connected to the image capturing apparatus with a cable or the like so that a plurality of users can view the images simultaneously. More specifically, image signals displayed on a screen of an image capturing apparatus are converted to a television image according to the NTSC (National Television System Committee) method. The NTSC image is outputted to a television apparatus connected to the image capturing apparatus with a cable, thereby achieving the display.

The display format of a television apparatus includes the NTSC method where displaying is realized with 720×480 resolution, and the HD method where displaying is realized with 1920×1600 high resolution.

In a network-connected environment, there is a remote desktop technique that enables a client machine to remotely operate a server machine. The desktop screen of a server machine is converted to a bitmap image, and the converted bitmap image is sequentially transmitted to a client machine which performs the remote operation according to a predetermined protocol. The transmitted bitmap image is enlarged or reduced to adapt the size to the screen of the client machine. This realizes remote displaying of the desktop screen of the server machine.

The above-described conventional art is disclosed in, e.g., Japanese Patent Application Laid-Open No. 6-124080.

However, in a conventional portable device such as a digital camera, in a case of generating a low-resolution image such as an NTSC image on the display screen and transmitting the image to a large-size television apparatus to be displayed, there is a problem of significant coarseness of the image.

SUMMARY OF THE INVENTION

The present invention has been proposed in view of the above-described problem, and has as its object to provide a technique of displaying an image, which is displayed on a display unit of a portable device such as a digital camera, on a display unit of an apparatus connected to the portable device through a network with high image quality.

To solve the above problems and achieve the above object, according to the present invention, an image data transmission apparatus that transmits image data corresponding to a display of a display unit to a device connected to the apparatus through a network for having the device display the display of the display unit, comprising:

a transmission data generation unit that generates transmission data including image data corresponding to the display of the display unit and attribute information of the image data; and a transmission control unit that transmits the transmission data generated by the transmission data generation unit to the device connected to the apparatus through the network.

According to the present invention, it is possible to display an image, which is displayed on a display unit of a portable device, on a display unit of an apparatus connected to the portable device through a network with high image quality.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2B is a block diagram showing a configuration of a remote display control apparatus according to the embodiment of the present invention;

FIG. 9 is a view showing a data structure used in thumbnail displaying in FIG. 8;

FIG. 10 shows an example of rendering data in the SVG (Scalable Vector Graphics) format written in a structured document data, which is used for rendering on a display unit of a digital camera;

FIG. 12 shows an example of a transmission data structure in the XOP (XML-binary Optimization Packaging) format.

DESCRIPTION OF THE EMBODIMENTS

Figure 1:
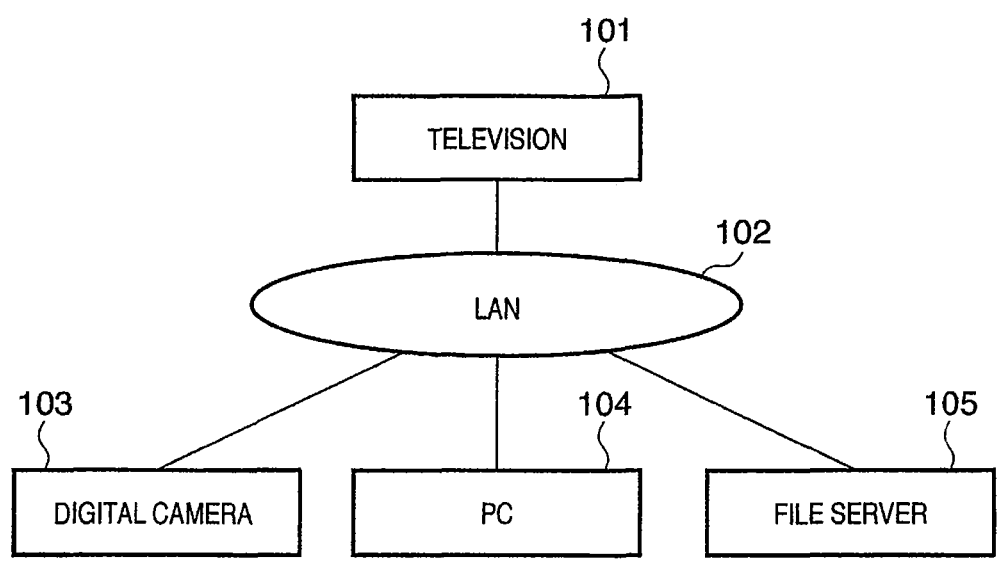
FIG. 1 is an overview of a system including a television apparatus, a digital camera and the like according to an embodiment of the present invention.

Preferred embodiments of the present invention will now be described in detail in accordance with the accompanying drawings. FIG. 1 is an overview of a system including a television apparatus 101, a digital camera 103 and the like according to an embodiment of the present invention. In FIG. 1, the television apparatus 101 is connected to the LAN 102. Connected to the LAN 102 are: an image data transmission apparatus 103 (hereinafter a digital camera will be explained as a preferred example) such as a digital camera or a mobile telephone having a camera function and so forth, a data processing apparatus (PC) 104, and a file server 105.

Figure 2A:
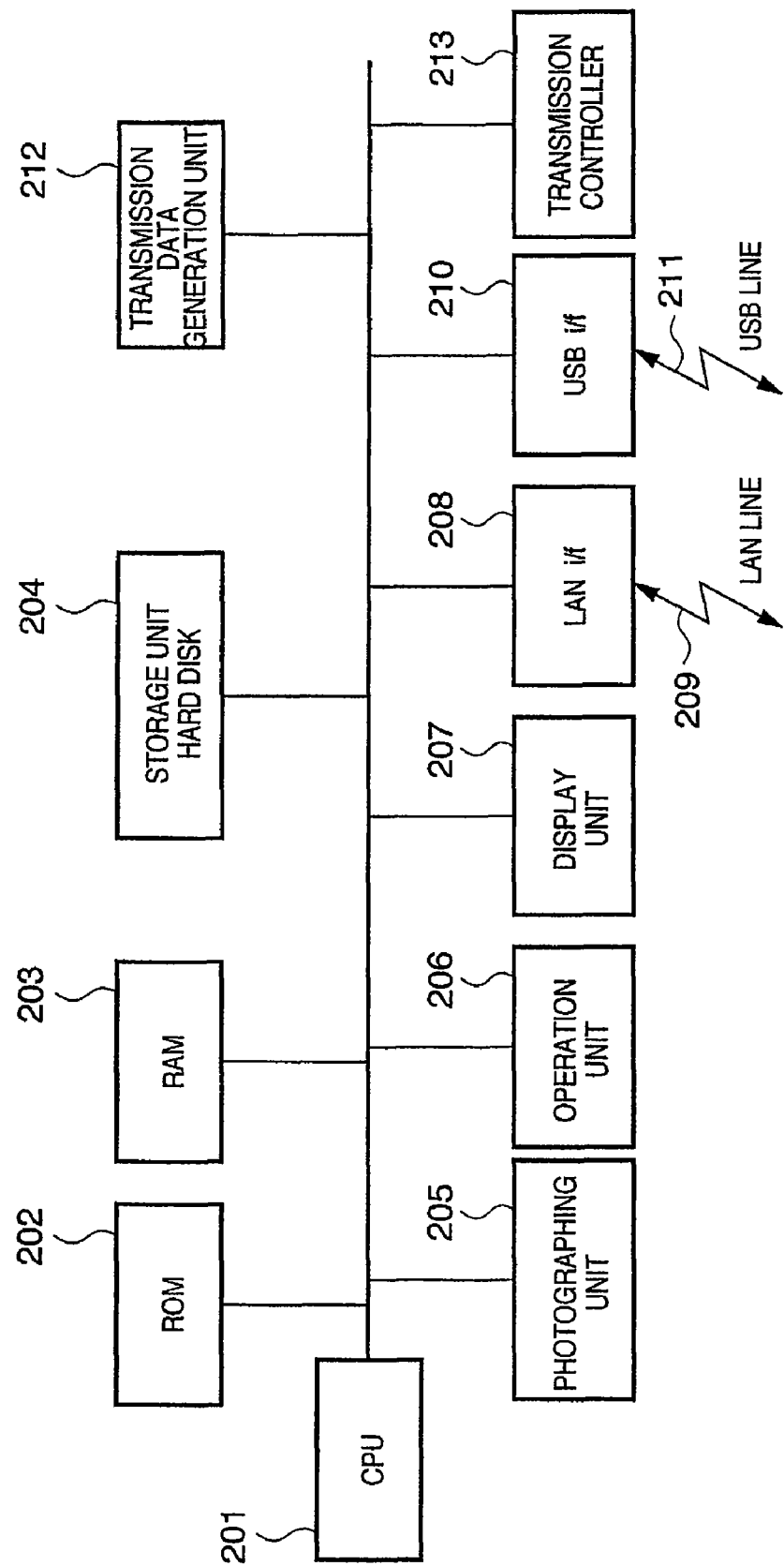
FIG. 2A is a block diagram showing a configuration of a digital camera (first device) according to the embodiment of the present invention.

FIG. 2A is a block diagram showing a configuration of the digital camera (first device) 103, which serves as an image capturing apparatus according to the embodiment of the present invention. In FIG. 2A, the CPU 201 serving as a system controller controls the entire digital camera 103. ROM 202 is provided for storing various fixed data and control programs of the CPU 201. RAM 203, configured with SRAM, DRAM or the like, is provided for storing program control variables and so forth. Various setting parameters and various work buffers are also stored in the RAM 203. A storage unit 204, configured with a hard disk or the like, is provided for storing captured image data. A photographing unit 205 is configured with an image capturing element which captures a photograph target, e.g., landscape and portrait. An operation unit 206, configured with buttons, a touch panel and so on, is provided for an operator to perform various input operations. A display unit 207 is configured with an LCD or the like. A LAN I/F 208 is an interface for connection with a LAN line 209. A USB I/F 210 is an interface for connection with a USB line 211. Image data captured by the digital camera 103 can be stored in the file server 105 together with an analysis result of its attribute.

The digital camera (image data transmission apparatus) 103 according to the present embodiment comprises a transmission data generation unit 212 for generating, under the control of the CPU 201, transmission data that includes compressed image data corresponding to the display of the display unit 207 and attribute information of the compressed image data. The digital camera (image data transmission apparatus) 103 also comprises a transmission controller 213 for transmitting, under the control of the CPU 201, the transmission data generated by the transmission data generation unit 212 to a device connected through the network 102. The transmission controller 213 is capable of transmitting the generated transmission data to the designated device in a HTTP (Hyper Text Transfer Protocol) format according to a user's transmission designation. The transmission controller 213 is also capable of transmitting data in a TCP/IP format.

In a case where the displaying on the display unit 207 is performed based on a plurality of image data, the transmission data generation unit 212 adds attribute information, which indicates that the transmission data is in a XOP (XML-binary Optimization Packaging) format, to the header of the transmission data. The XOP format will be described later with reference to reception processing of plural image data.

In a case where the displaying on the display unit 207 is performed based on a plurality of image data such as that shown in FIG. 9, the transmission data generation unit 212 generates transmission data based on a background image 901 and rendering data 903 stored in the RAM 203 as well as compressed image data 902 in the storage unit 204. The rendering data 903 includes reference information (data names and ID) specifying each compressed image data and background image data, and layout information specifying the display size and position based on each compressed image data and background image data on the display unit 207.

Figure 11:
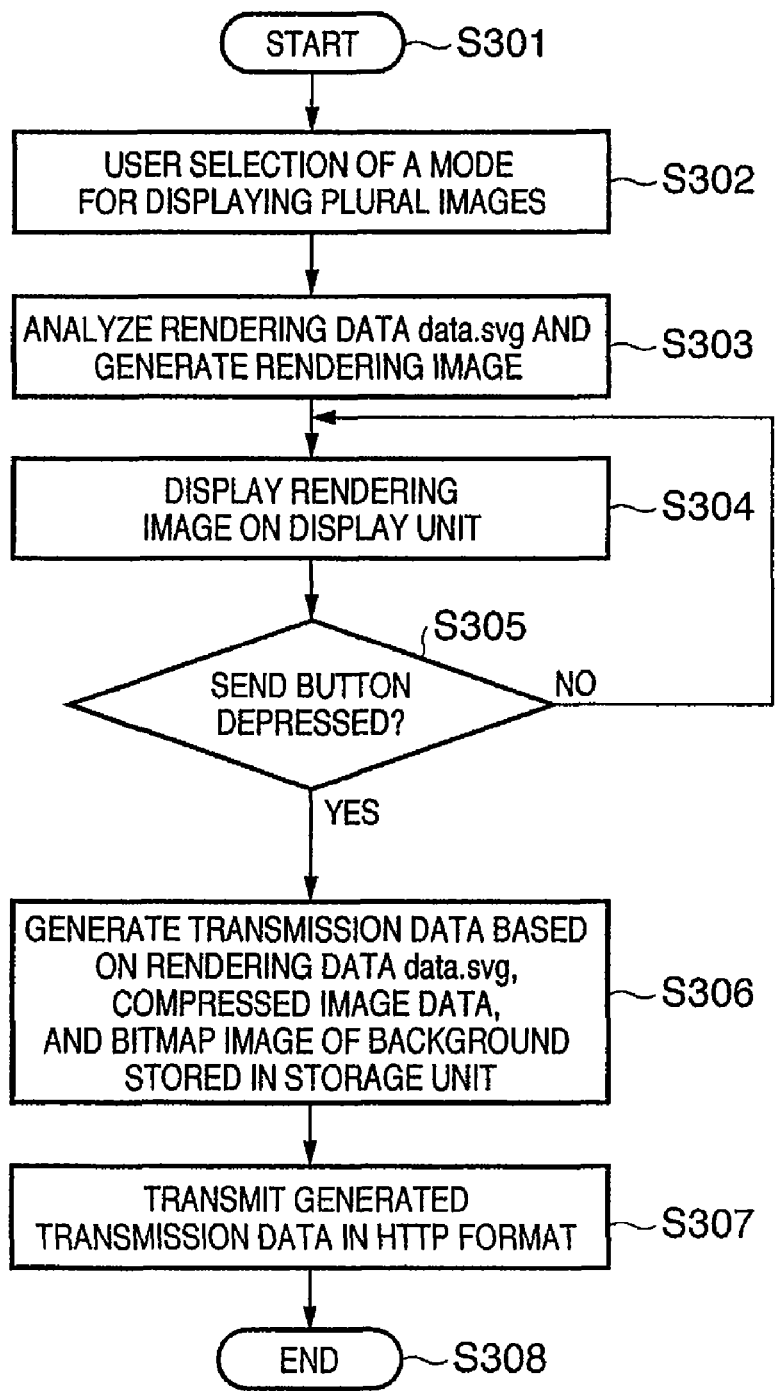
FIG. 11 is a flowchart describing the processing for displaying plural image data on a display unit of a digital camera based on a background image, captured compressed image data, and rendering data.

The specific processing of the above description corresponds to FIG. 9, FIG. 10, and step 5306 in FIG. 11.

A remote display control apparatus 280 adapts the display of the display unit 207 of the first device (digital camera 103) to the display format of the display unit 305 of the second device (television apparatus 101 or PC 104). The remote display control apparatus 280 has a configuration shown in FIG. 2B.

In FIG. 2B, ROM 252 is provided for storing various data and control programs of a CPU 251. RAM 253, configured with SRAM, DRAM or the like, serves as an internal memory for storing program control variables and so forth. A storage unit 254, configured with a hard disk or the like, is capable of storing compressed image data, attribute information indicative of an attribute of the compressed image data and so on, which are transmitted from the digital camera 103.

An analysis unit 271 analyzes an attribute of compressed image data included in the transmission data transmitted from the first device (digital camera 103). In accordance with an analysis result of the analysis unit 271, an image data generation unit 273 generates image data, which is adapted to a display format of the display unit 305 of the second device, based on the compressed image data transmitted from the digital camera 103. Based on the generated image data, a display control unit 274 displays the image data on a display unit 305 of the second device (e.g., television apparatus 101).

Figure 3:
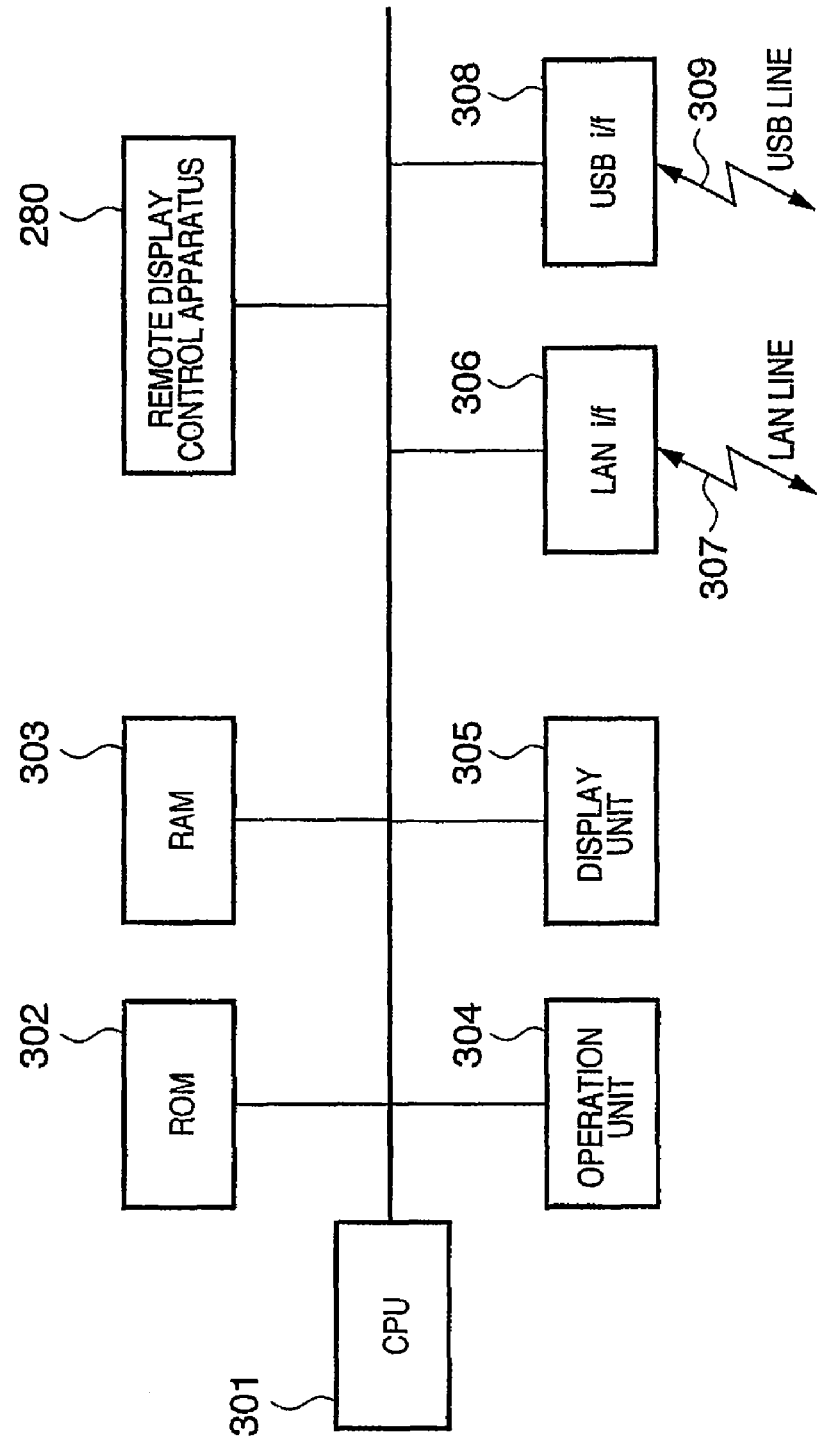
FIG. 3 is a block diagram showing as an example a configuration of a television apparatus (second device) according to the embodiment of the present invention.

FIG. 3 is a block diagram showing as an example a configuration of the television apparatus (second device) 101 according to the embodiment of the present invention. In FIG. 3, a CPU 301 serving as a system controller controls the entire apparatus. ROM 302 is provided for storing various fixed data and control programs of the CPU 301. RAM 303, configured with SRAM, DRAM or the like, is provided for storing program control variables and so forth. Various setting parameters and various work buffers are also stored in the RAM 303. An operation unit 304, configured with buttons, a touch panel and so on, is provided for an operator to perform various input operations. A display unit 305 is a television screen for displaying an image. A LAN I/F 306 is an interface for connection with a LAN line 307. A USB I/F 308 is an interface for connection with a USB line 309. Through the LAN I/F 306 or the USB I/F 308, the television apparatus 101 is capable of receiving data transmitted by the digital camera 103.

In FIG. 3, numeral 280 denotes the remote display control apparatus described in FIG. 2B. By virtue of the apparatus 280, it is possible to adapt the display of the display unit 207 of the digital camera 103 to the display format of the display unit 305 of the television apparatus 101, thus realizing high-quality image displaying. Note that FIG. 3 shows an example where the remote display control apparatus 280 is incorporated in the construction of the television apparatus 101. However, also in a case of controlling the display of the PC 104, the remote display control apparatus 280 may be incorporated in the construction of the PC 104 for enabling the display control adapted to the display format of the display unit of the PC 104.

[Example on Remote Displaying]

Described next is an example where a piece of image compressed in the JPEG format, which is displayed on the display unit 207 of the digital camera 103, is remotely displayed on a screen of the television apparatus 101 or PC 104.

The compressed image data in the JPEG format is stored in the storage unit 204. By referring to the stored data, the CPU 201 can display the image on the display unit 207.

Note that although the present embodiment describes the JPEG (Joint Photographic Experts Group) format data as an example of compressed image data, the purport of the present invention is not limited to this, and the invention is applicable to data compressed in the PNG (Portable Network Graphics) format.

Figure 4:
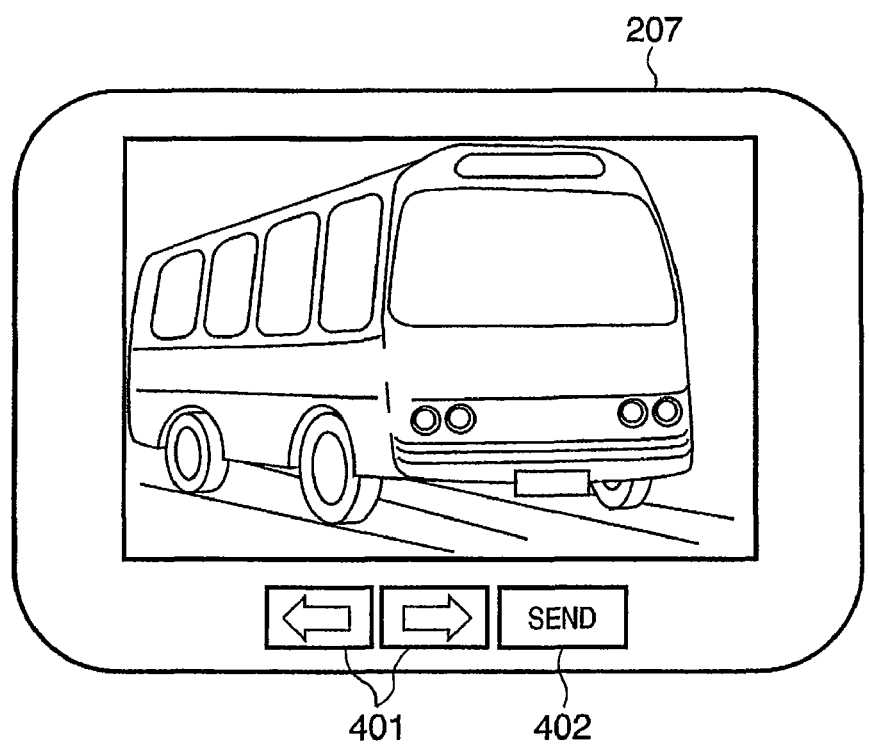
FIG. 4 shows as an example a piece of compressed image data captured by a digital camera 103 and displayed on a display unit 207 with an adjusted aspect ratio to adapt the size to the display unit 207.

FIG. 4 shows an example of a display screen where an image captured by the digital camera 103 is displayed on the display unit 207 of the digital camera 103. The display screen of the display unit 207 has an image selection button 401 and a send button 402 for designating transmission of the compressed image data which corresponds to the selected image.

By operating the image selection button 401, a user can switch images displayed on the display unit 207 in sequence. The user selects a desired image and depresses the send button 402. When this operation is detected, the digital camera 103 generates transmission data regarding the selected image, and shifts the control to transmission processing of the generated transmission data. Hereinafter, data transmission processing is described with reference to the flowchart in FIG. 5.

[Data Transmission Processing]

Figure 5:
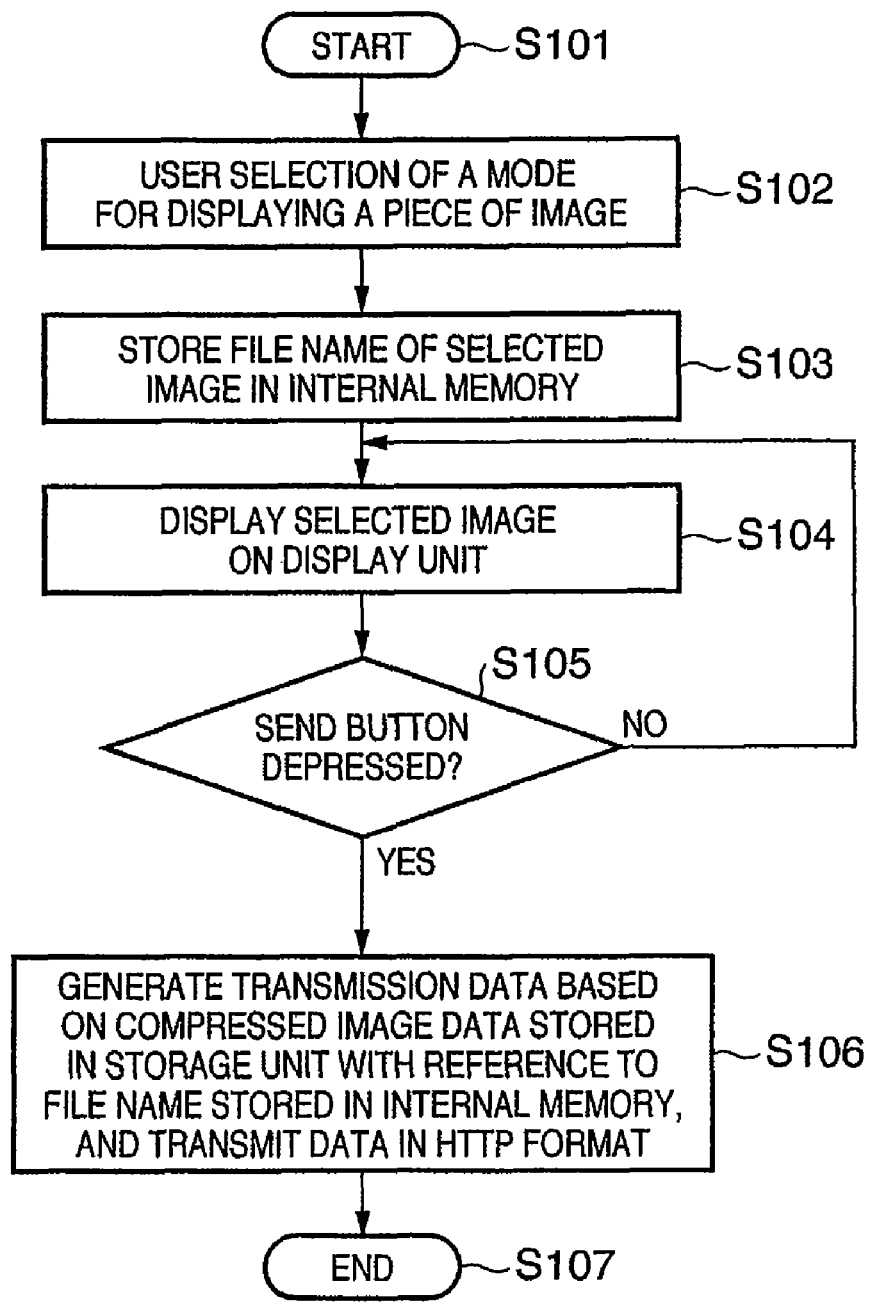
FIG. 5 is a flowchart describing the processing for transmitting compressed image data, which is corresponding to a piece of image displayed on a display unit of a digital camera, to a television apparatus connected to the digital camera through a network.

FIG. 5 is a flowchart describing the processing for transmitting under the control of the CPU 201 compressed image data, which is corresponding to a piece of image displayed on the display unit 207 of the digital camera 103, to the television apparatus connected to the digital camera 103 through the network.

First, mode selection for displaying a piece of image on the display unit 207 is detected (S102).

Then, a file name of compressed image data, corresponding to the image selected by the user on this mode, is stored in an internal memory (e.g., RAM 203) (S103).

With reference to the size of the area of the display unit 207 where the image is to be displayed, the CPU 201 performs thinning of the image data and generates image data to be displayed on the display unit 207 (S104).

In step S105, the CPU 201 determines whether or not the user has selected the send button 402. If it is determined that the send button 402 has been selected, the transmission data generation unit 212 refers to the file name stored in the internal memory and selects the compressed image data and attribute information indicative of the attribute of the compressed image data which are stored in the storage unit 204 as a substitute image data of the image data displayed on the display unit 207. Based on the selected compressed image data and attribute information, transmission data is generated. The transmission data generation unit 212 determines an attribute of the compressed image data. In a case where the compressed image data is in the JPEG format, attribute information "image/jpeg" is added to the header of the transmission data to generate transmission data. Under the control of the CPU 201, the transmission controller 213 transmits the generated transmission data to an apparatus connected through the network 102 (e.g., the television apparatus 101) in the HTTP format (S106).

[Data Reception Processing]

Described next is reception processing of the television apparatus 101 which receives the transmission data transmitted by the digital camera 103.

Figure 6:
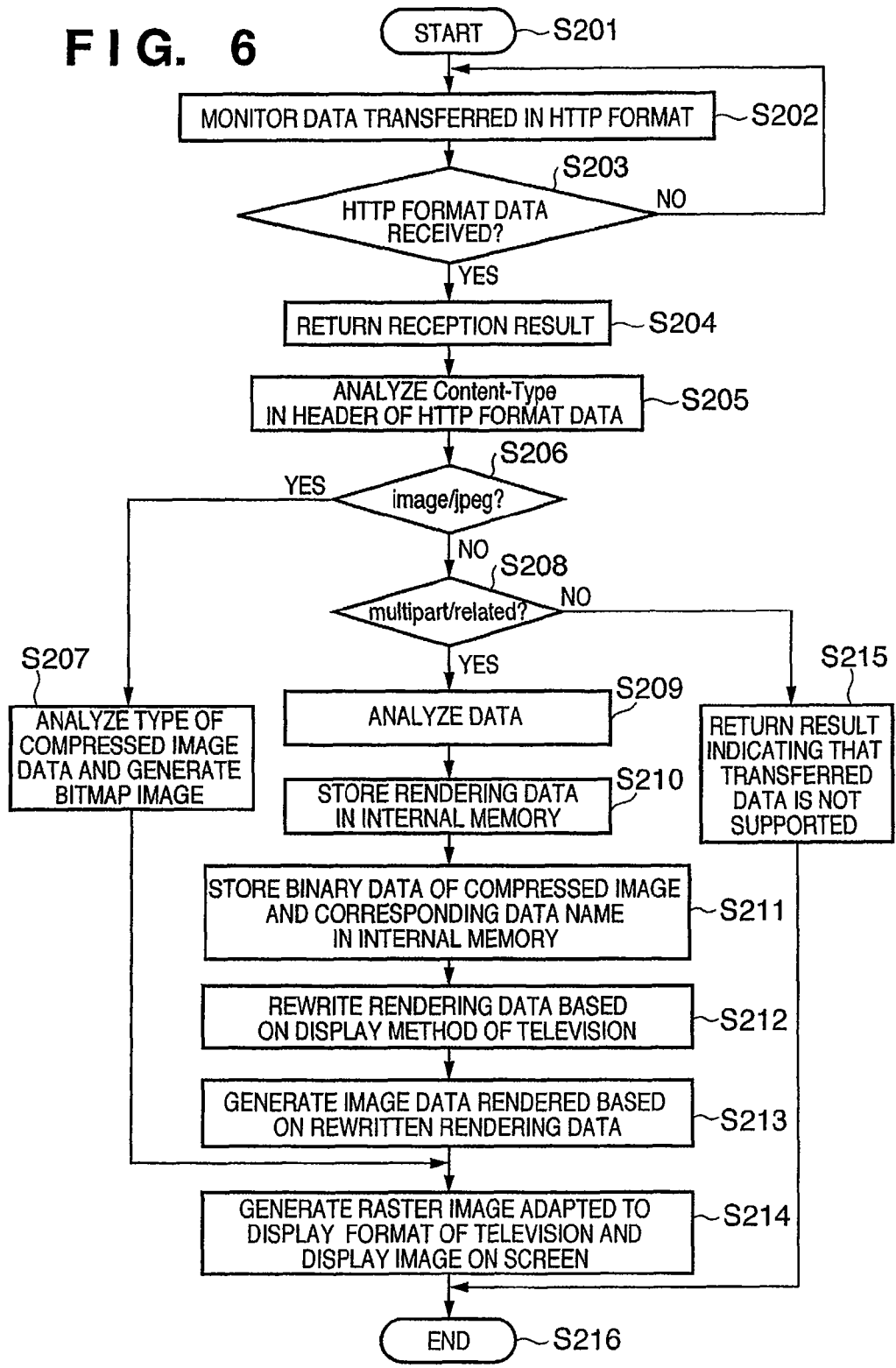
FIG. 6 is a flowchart describing the processing for receiving data transmitted by a digital camera and displaying it on a display unit of a television apparatus.

FIG. 6 is a flowchart describing the processing for receiving the transmission data transmitted by the digital camera 103 and displaying it on the display unit 305 of the television apparatus 101. The CPU 301 monitors data transmitted in the HTTP format from other devices, including the digital camera 103, through the LAN I/F or USB I/F (306 or 308) (S202). When the CPU 301 determines that data in the HTTP format is received, the CPU 301 returns a result, indicative of the successful data reception, to the digital camera 103 which is the originator of the transmission data (S204).

In step S205, the attribute information added to the header of the transmission data in the HTTP format, which is transmitted from the digital camera 103, is analyzed. In step S206, it is determined whether or not the attribute information is a JPEG format. Herein assume that the determination processing on attributes is performed by the analysis unit 271 of the remote display control apparatus 280 under the control of the CPU 301.

In a case where the analysis result of the attribute information of the compressed image data is JPEG format (YES in S206), the control proceeds to step S207 where the compressed image data is analyzed and a bitmap image is generated.

In step S214, based on the generated bitmap image, a raster image in the NTSC format, HD format or the like that is adapted to the display format of the display unit 305 is generated and displayed on the display unit 305 (S214). Herein, assume that the generation processing of the raster image adapted to the display format of the display unit 305 is performed by the image data generation unit 273 under the control of the CPU 301, and that displaying of the image on the display unit 305 is performed by the display control unit 274.

Figure 7:
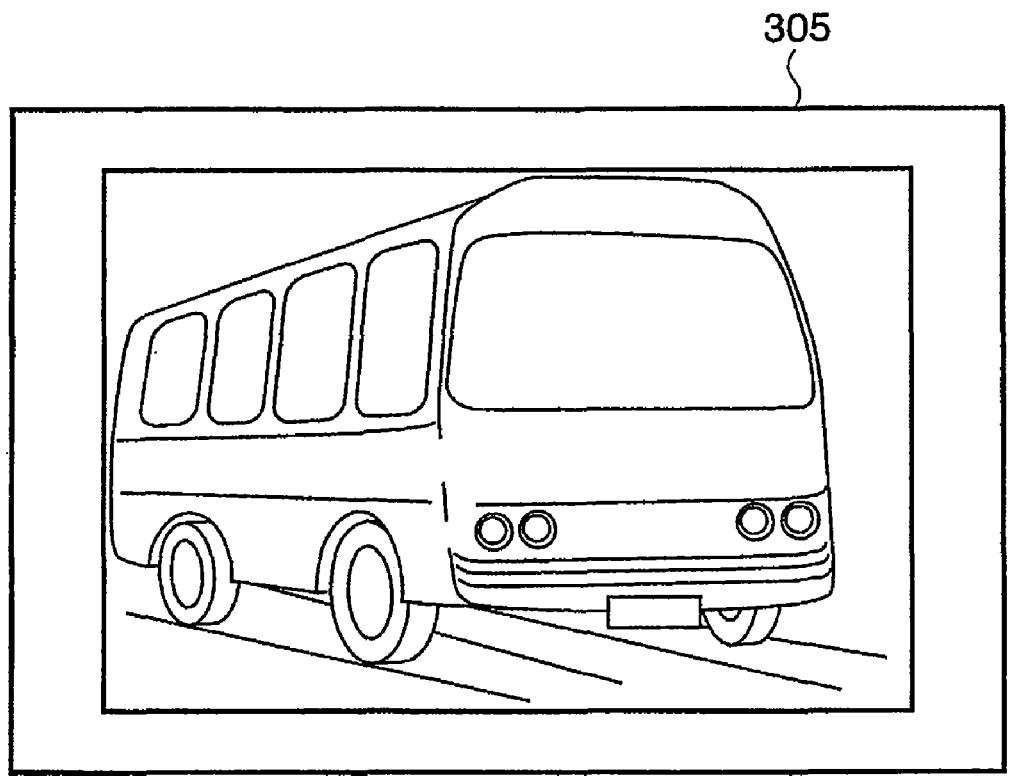
FIG. 7 shows an example where a display screen of a digital camera displaying a piece of image data is remotely displayed on a display unit of a television apparatus.

According to the above-described processing, a piece of image displayed on the display unit 207 of the digital camera 103 can be displayed on the display unit 305 of the television apparatus 101 with high image quality as shown in FIG. 7.

When the user designates selection and transmission of a next image with the use of the operation button 401 and the send button 402 of the digital camera 103, transmission data that includes compressed image data corresponding to the selected image is newly generated according to the similar procedure. The newly generated transmission data is processed by the analysis unit 271, the image data generation unit 273, and the display control unit 274, and a raster image adapted to the display format of the display unit 305 is generated. As a result, high quality image displaying becomes possible.

[Remote Displaying of Plural Images]

Figure 8:
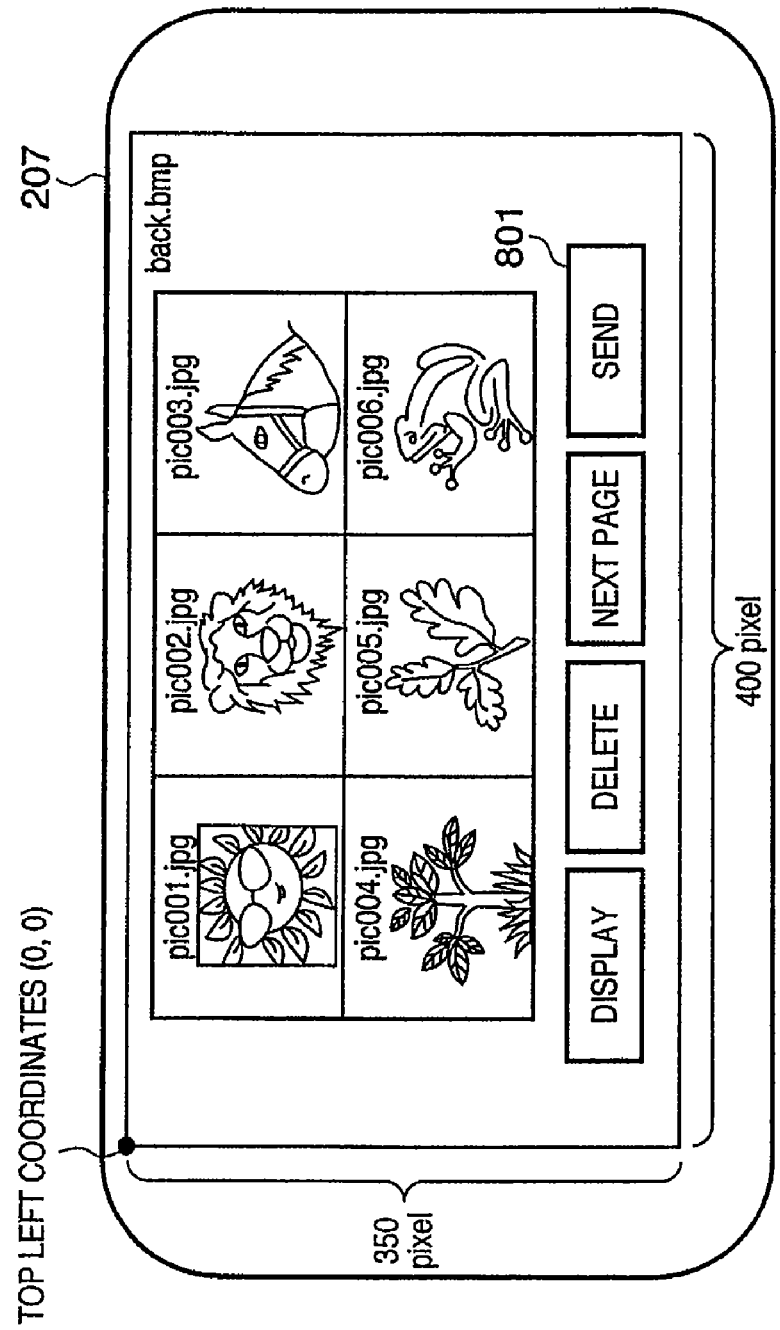
FIG. 8 shows an example where captured images are displayed in order of file names.

Described next is an example of remote displaying of plural captured images, which are displayed on the display unit 207 of the digital camera 103, on the screen of the television apparatus 101. FIG. 8 shows an example where captured images pic001.jpg to pic006.jpg are displayed in order of image file names. On the background (back.bmp) of these images, frames for arranging the images as well as "display", "delete", and "send" buttons 801 are provided for an operator to operate. When a button is operated on the touch panel provided on the display unit 207 of the digital camera, an event (instruction) is informed to the application program, thereby enabling to switch the thumbnail images.

FIG. 9 is a view showing a data structure used in thumbnail displaying in FIG. 8. Assume that the background image 901 written with bitmap data and the rendering data 903 in the Scalable Vector Graphics (SVG) format, which is used in displaying the background image 901 and captured image data on the display unit of a digital camera, are stored in the RAM 203. Further assume that the compressed image data 902 which has been captured is stored in the storage unit 204.

Assume that the rendering data 903 is a structured document data in the SVG format based upon the vector graphics specification of the W3C (World Wide Web Consortium) standard as shown in FIG. 10. In the rendering data 903, the background image 901 (data name: 'back.bmp') is allocated to ID=0. Further, the display position of the background image 901 is designated to be rendered with the top left coordinates (0, 0), the width of 400 pixels, and the height of 350 pixels.

In FIG. 10, the data name and ID, which are the reference information, specify each compressed image data (including the background image). Information related to the top left coordinates, width, and height, which are the layout information, specify the display position and size of each compressed image data (including the background image) on the display unit 207. By virtue of the rendering data 903, each compressed image data (including the background image) can be associated with the layout information.

In the example shown in FIG. 10, IDs 1 to 6 are allocated to compressed image data (data names: pic001.jpg to pic006.jpg) as reference information. For layout information, the top left coordinates (X,Y), width and height data with which each image data is to be rendered on the screen are designated.

The rendering data 903 in the SVG format includes reference information and layout information related to each compressed image data. Changing the description of the layout information in the rendering data 903 can control the display position and size of each compressed image data on the television apparatus 101.

[Data Transmission Processing]

A description is provided on the processing for a case where images based on plural image data are displayed on the display unit 207 of the digital camera 103. FIG. 11 is a flowchart describing the processing for displaying plural image data on the display unit 207 of the digital camera 103 based on the background image 901, captured compressed image data 902, and rendering data 903 under the control of the CPU 201.

First, user's mode selection for displaying plural images is detected (S302). In response to detection of the mode selection, the CPU 201 generates a rendering image by analyzing the rendering data 903 stored in the RAM 203 (S303). Then the generated rendering image is displayed on the display unit 207 (S304). In step S305, the CPU 201 determines whether or not selection of the send button 801 has been detected.

When selection of the send button 801 is detected, the transmission data generation unit 212 generates transmission data shown in FIG. 12 based on the background image 901 and rendering data 903 in the RAM 203 as well as the compressed image data 902 in the storage unit 204 under the control of the CPU 201 (S306).

Attribute information 1201 ('multipart/related') indicating that the transmission data bases upon the plural image data displayed on the display unit 207 is added to the header of the transmission data, which has been generated by the transmission data generation unit 212 under the control of the CPU 201. The transmission data further includes the aforementioned reference information (ID 1202, data name 1203), layout information (top left coordinates, width, and height of the screen) 1204, and each compressed image data 1205.

The transmission data is in the XOP format publicized as a W3C recommendation, which is a specification providing the standard means to packet an XML document and binary data as it is into a communication packet for handling binary data in a Web service. The analysis unit 271 of the remote display control apparatus 280 can determine whether or not the transmission data is in the XOP format based on the attribute information 1201 ('multipart/related').

In step 5307, the transmission controller 213 transmits the generated transmission data to the apparatus (e.g., television apparatus 101) connected through the network 102 in the HTTP format under the control of the CPU 201.

[Data Reception Processing]

When the television apparatus 101 receives the transmission data in the XOP format that has been transmitted in the HTTP format from the digital camera 103, the transmission data is processed according to steps 5202 to 5205 in FIG. 6 as similar to the processing of compressed image data corresponding to a piece of image.

When the analysis in step 5206 finds that the attribute information added to the header of the transmission data is not JPEG-format (image/jpeg) data (NO in S206), the control proceeds to step 5208.

In step 5208, the analysis unit 271 of the remote display control apparatus 280 determines whether or not the attribute information added to the transmission data is XOP format (multipart/related) data under the control of the CPU 301. If the analysis unit 271 determines that the transmission data is not XOP format data (NO in S208), the CPU 301 returns information back to the digital camera 103, which is the transmission originator, that the transmission data is not supported by the television apparatus 101 (S215).

Meanwhile, if the analysis in step S208 determines that the transmission data is XOP format data (YES in S208), the analysis unit 271 further analyzes the transmission data (S209). Then, the analysis unit 271 stores rendering data in the SVG format in the internal memory (S210), and then stores binary data of the compressed image included in the transmission data as well as the corresponding data name in the internal memory (S211).

In step S212, based on the display method of the television apparatus 101 such as the NTSC method and HD method, the image data generation unit 273 obtains a scaling factor necessary to display each compressed image data on the television screen. The image data generation unit 273 rewrites the rendering data (reference information and layout information) in the SVG format stored in the internal memory based on the obtained scaling factor to be adapted to the display method of the display unit 305, and stores it in the storage unit 254 (S212). By virtue of the processing in step S212, it becomes unnecessary to refer to the display method of the television apparatus 101 each time image data is re-rendered; as a result, rendering speed increases. The image data generation unit 273 generates image data rendered based on the rewritten rendering data in the SVG format (S213).

In step S214, the image data generation unit 273 generates a raster image based on the generated image data according to the display format of the display unit 305 of the television apparatus 101. The display control unit 274 of the remote display control apparatus 280 causes the display unit 305 of the television apparatus 101 to display the raster image generated by the image data generation unit 273 (S214).

Figure 13:
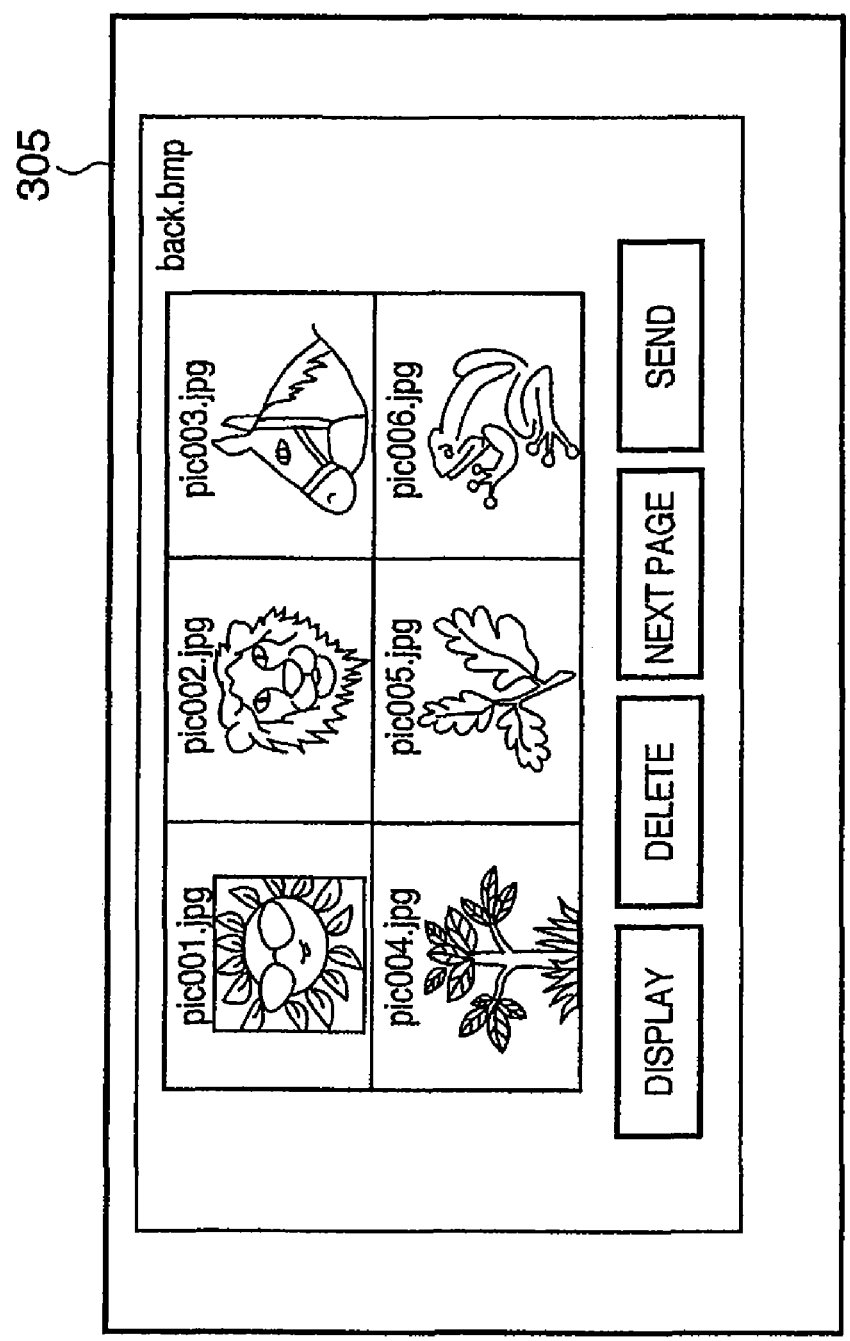
FIG. 13 shows an example where a screen of a digital camera displaying plural image data is remotely displayed on a display unit of a television apparatus.

As a result, for instance, the images displayed on the display unit 207 of the digital camera 103 can be displayed on the display unit 305 of the television apparatus 101 as shown in FIG. 13 with high image quality of the photographed portions.

In a case where a display screen of a transmission originator including image data such as photographs is remotely displayed on a transmission destination device, compressed image data of the image portion such as photographs stored in the storage unit of the transmission originator can be transmitted to the transmission destination device, and the image of the photograph portion can be displayed remotely on the screen of the transmission destination device with high image quality.

According to the present embodiment, it is possible to display an image, which is displayed on a display unit of a portable device, on a display unit of an apparatus connected to the portable device through a network with high image quality.

[Other Embodiment]

The object of the present invention can also be achieved by providing a storage medium, storing program codes of software realizing the above-described functions of the embodiment, to a computer system or apparatus. Further it can also be achieved by reading the program codes, by a computer (CPU or MPU) of the system or apparatus, from the storage medium and executing the program.

In this case, the program codes read from the storage medium realize the functions according to the embodiment, and the storage medium storing the program codes constitutes the invention.

The storage medium, such as a flexible disk, a hard disk, an optical disk, a magneto-optical disk, CD-ROM, CD-R, a non-volatile memory card, and ROM can be used for providing the program codes.

Furthermore, aforesaid functions according to the above embodiment are realized by executing the program codes which are read by a computer. The present invention includes a case where an OS (operating system) or the like working on the computer performs part or the entire processes in accordance with designations of the program codes and realizes the above embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-241558 filed on Aug. 23, 2005, which is hereby incorporated by reference herein in its entirety.

What is claimed is:

1. A system comprising:
    (1) an image data transmission apparatus comprising:
    (1-1) a mode determination unit that determines whether a single image mode for displaying a single image, or a plural image mode for displaying plural images;
    (1-2) a display unit that displays a low resolution representation of (a) the single image if the single image mode is determined by the mode determination unit, or (b) the plural images on a background image according to layout data if the plural image mode is determined by the mode determination unit, the background image including a send button image;
    (1-3) a transmission data generation unit that generates (c) first transmission data for a high-resolution representation of the single image if the single image mode is determined by the mode determination unit, or (d) second transmission data for a high-resolution representation of the plural images, the background image data and the layout data in a predetermined format when the send button image on the background image is designated by a user if the plural image mode is determined by the mode determination unit; and
    (1-4) a transmission control unit that transmits, through a network, the first transmission data or the second transmission data to a remote device which displays (e) the high-resolution representation of the single image, or (f) the high-resolution representation of the plural images on the background image including the send button image based on the layout data,
    (2) a remote device comprising:
    (2-1) a reception unit that receives the first transmission data or the second transmission data;
    (2-2) a first display unit that renders the high-resolution representation of the single image and displays the high-resolution representation of the single image on a display apparatus if the first transmission data is received;
    (2-3) a second display unit, if the second transmission data is received, that;
        (2-3-1) obtains a scaling factor to display the high-resolution representation of the plural images on the display apparatus based on a display method of the display apparatus;
        (2-3-2) writes a rendering data in a SVG format based on the obtained scaling factor;
        (2-3-3) stores the written rendering data; and
        (2-3-4) displays the high-resolution representation of the plural images on the background image including the send button image based on according to the stored rendering data; wherein each of the plural images is displayed without referring to the display method of the display apparatus.

2. The image data transmission apparatus according to claim 1, wherein the predetermined format is a XOP (XML-binary Optimization Packaging) format.

3. A method to be executed in a system including an image transmission apparatus and a remote device, said method comprising:
    (1) an image data transmission method to be executed in the image transmission apparatus, said image data transmission method comprising:
    (1-1) a mode determination step that determines whether a single image mode for displaying a single image, or a plural image mode for displaying plural images;
    (1-2) a display step that displays a low resolution representation of (a) the single image if the single image mode is determined in the mode determination step, or (b) the plural images on a background image according to layout data if the plural image mode is determined in the mode determination step, the background image including a send button image;
    (1-3) a transmission data generation step that generates (c) first transmission data for a high-resolution representation of the single image if the single image mode is determined by the mode determination unit, or (d) second transmission data for a high-resolution representation of the plural images, the background image data and the layout data in a predetermined format when the send button image on the background image is designated by a user if the plural image mode is determined by the mode determination step; and
    (1-4) a transmission control step that transmits, through a network, the first transmission data or the second transmission data to a remote device which displays (e) the high-resolution representation of the single image, or (f) the high-resolution representation of the plural images on the background image including the send button image based on the layout data,
    (2) a method to be executed in the remote device, said method comprising:
    (2-1) a reception step that receives the first transmission data or the second transmission data;
    (2-2) a first display step that renders the high-resolution representation of the single image and displays the high-resolution representation of the single image on a display apparatus if the first transmission data is received; and (2-3) a second display step, if the second transmission data is received, that;

(2-3-1) obtains a scaling factor to display the high-resolution representation of the plural images on the display apparatus based on a display method of the display apparatus;

(2-3-2) writes a rendering data in a SVG format based on the obtained scaling factor;

(2-3-3) stores the written rendering data; and (2-3-4) displays the high-resolution representation of the plural images on the background image including the send button image based on according to the stored rendering data; wherein each of the plural images is displayed without referring to the display method of the display apparatus.

4. The image data transmission method according to claim 3, wherein the predetermined format is a XOP (XML-binary Optimization Packaging) format.

5. An image data transmission apparatus according to claim 1, wherein the background image data is bitmap data.

6. An image data transmission apparatus according to claim 1, wherein the single image included in the first transmission data and the second transmission data are compressed for said transmission.

7. The image data transmission apparatus according to claim 1, wherein the transmission control unit transmits the first transmission data with a first attribute information or the second transmission data with a second attribute information to the remote device which displays (e) the high-resolution representation of the single image, or (f) the high-resolution representation of the plural images on the background image according to the first and second attribute information based on the layout data.

* * * * *